Feb. 20, 1923.
F. E. VAUGHAN.
SURVEYING INSTRUMENT.
FILED OCT. 24, 1921.
1,445,922.
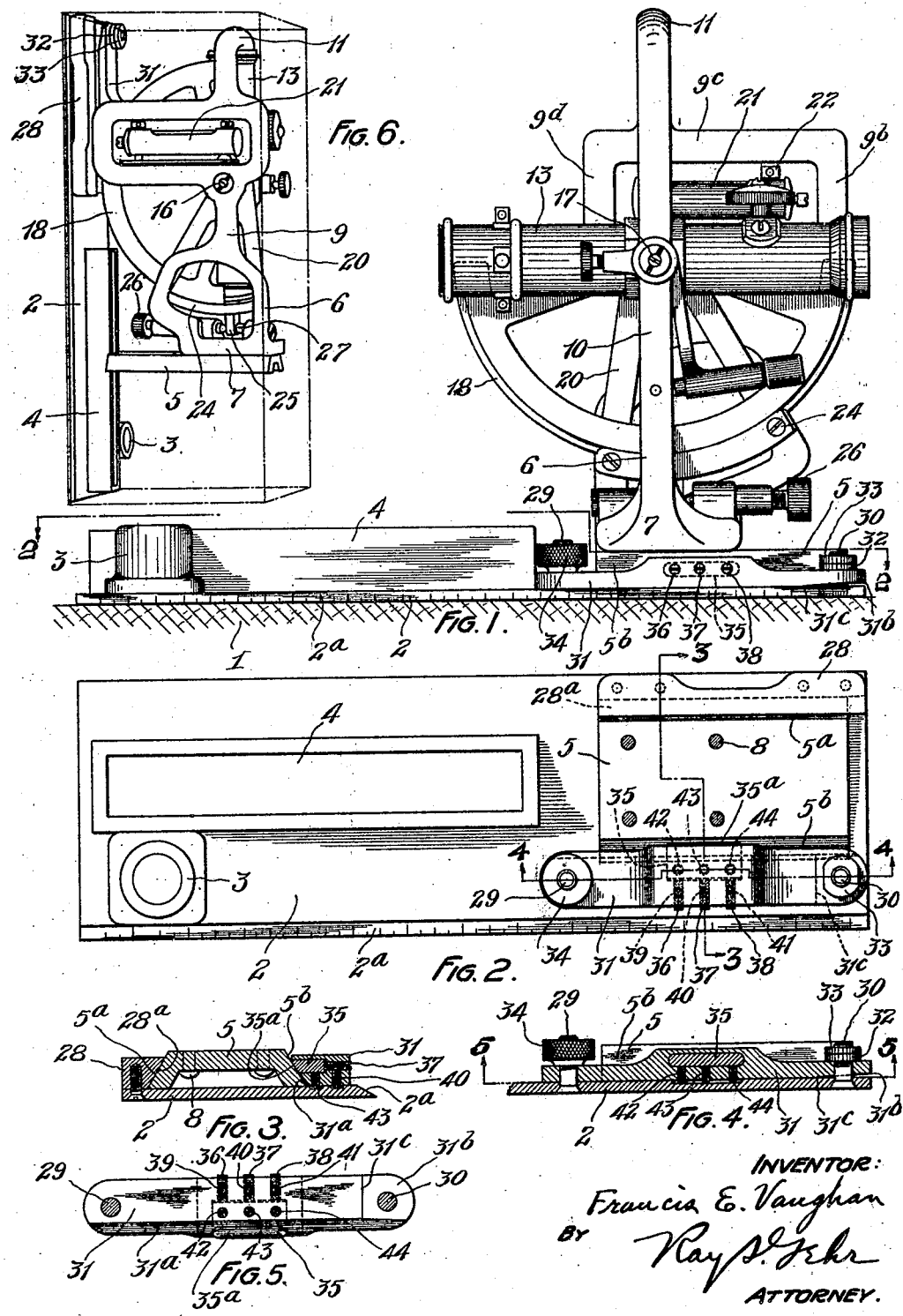

Patented Feb. 20, 1923.

1,445,922

UNITED STATES PATENT OFFICE.

FRANCIS E. VAUGHAN, OF PHILADELPHIA, PENNSYLVANIA.

SURVEYING INSTRUMENT.

Application filed October 24, 1921. Serial No. 510,048.

*To all whom it may concern:*

Be it known that I, FRANCIS E. VAUGHAN, a citizen of the United States, residing at Philadelphia, in the county of Philadelphia and State of Pennsylvania, have invented certain new and useful Improvements in and Relating to Surveying Instruments, of which the following is a specification, reference being had therein to the accompanying drawing.

This invention relates to surveying instruments and particularly to plane table alidades such as are used in surveying for the measurement of vertical angles and the location and plotting of points.

The chief object of the invention is to provide an instrument of the character in question in which the frame supporting the movable and adjustable parts is attached to the graduated base plate or straight edge of the instrument in such a manner that it can readily be removed therefrom for convenience in packing and carrying.

A further object of the invention is to provide a clamping device adapted to be quickly and easily operated to secure the frame of the instrument accurately in operative position on the base plate.

In order that the invention may be clearly understood, I will now describe a specific embodiment thereof, having reference to the accompanying drawing.

In the drawing, Figure 1 is a side elevation of the instrument as assembled for use.

Fig. 2 is a horizontal section on the line 2—2, Fig. 1.

Fig. 3 is a vertical section on the line 3—3, Fig. 2.

Fig. 4 is a vertical section on the line 4—4, Fig. 2.

Fig. 5 is a section on the line 5—5, Fig. 4.

Fig. 6 is a perspective view showing the main parts of the instrument in outline when it is taken down and disposed in a carrying case, the case being shown in outline by the dot and dash lines.

Referring in detail to the construction illustrated, 1 is a portion of the top of a table which may be of any construction suitable for use in plane table surveying. 2 is a base plate with graduated straight edge $2^a$. On the base plate is mounted a circular level 3 and a trough compass 4. The frame of the instrument, on which the movable and adjustable parts are mounted, comprises a base 5 and a frame casting 6 mounted on the base. The frame casting comprises a bottom section 7 which is rigidly secured to the base 5, as by screws 8, uprights 9 and 10, and a transverse section 11 at the top which joins the uprights and serves as a convenient handle to lift the instrument. Between the uprights 9 and 10 is disposed the sighting device in the form of a telescope 13, together with other movable and adjustable parts of such an instrument such as the vernier arm, vernier, bubble tube, clamp and tangent. These parts constitute no part of the present invention and need not be further described. In so far as they are shown, they are in accordance with the construction disclosed in my copending application, Serial No. 436,563, filed January 11, 1921, to which reference may be had for a fuller explanation of them.

The present invention relates more especially to the clamping means for securing the base 5 of the instrument frame to the graduated base plate 2. To the top of the base plate 2, along one side thereof, is rigidly pinned or secured a clamping strip or abutment 28 having its inner side undercut. Preferably this undercut side is formed with a bevelled surface $28^a$ and this surface is disposed in a predetermined relation to the straight edge of said plate. The adjacent side of the base 5 is formed with a correspondingly bevelled surface $5^a$ disposed in a predetermined relation to the plane of rotation of the line of collimation of the telescope. The opposite side of the base 5 is formed with a similar bevel $5^b$, 29 and 30 are screw studs rigidly secured to the base plate 2. The threads on the stud 29 are relatively coarse, preferably about twenty to the inch. 31 is an elongated bar constituting the movable limb or abutment of the clamp. This bar has a hole near each end to receive the studs 29 and 30. The forward end of the clamping bar 31 is held down by a nut 32 which is provided with a suitable locking nut 33. A knurled thumb nut 34 on the stud 29 secures the other end of the bar.

Referring more especially to Figs. 3, 4 and 5, it will be understood that the bar 31 has its inner side $31^a$ bevelled in a manner corresponding to the bevelled surface of the abutment 28, so as to conform to the adjacent bevel $5^b$ of the base 5. In its middle part, the bar 31 is thickened and formed with a horizontal slot or recess into which is fitted a movable block 35 having its exposed face formed with a bevel 35$^a$ parallel to the bevelled face 31$^a$ of the bar 31. The bevelled face 35$^a$ is preferably flush with the face 31$^a$ when the block is forced into its slot as far as it can go. A plurality of screws 36, 37 and 38 bear against the back of the block 35 and a series of screws 39, 40 and 41 serves to lock the screws 36, 37 and 38. Another series of screws 42, 43 and 44 serve to clamp the block 35 in any position to which it may be adjusted by the screws 36, 37 and 38. The bar 31 at its forward end is formed on its under side with a slight bevel 31$^b$ toward its end, the edge or beginning of the bevel being indicated at 31$^c$.

To adjust the clamping device so as to operatively receive and hold the frame of the instrument, the procedure is as follows: The screws 39, 40 and 41 are loosened to free the screws 36, 37 and 38. The screws 42, 43 and 44 are then turned so that they press lightly against the block 35 to hold it in position, but not so firmly that the block cannot be moved with moderate pressure. Then the screws 36, 37 and 38 are loosened and the block 35 is pressed into its slot as far as possible. The parts of the instrument are then set up as in Fig. 1. The nut 32 is screwed down rather firmly to the bar 31 and the nut 34 is screwed down so as to touch said bar only lightly. The screws 36, 37 and 38 are now tightened until the block 35 presses firmly against the adjacent bevelled side of the frame base 5, so as to hold it securely. Then nuts 32 and 34 and the member 31 are removed and the screws 39, 40 and 41, and 42, 43 and 44 are tightened, thus locking the block 35 rigidly in its adjusted position. The bar 31 is now replaced upon the base plate 2, and the nuts 32 and 33 screwed into position. The nut 34 is then screwed down upon the bar 31 and thereupon loosened by a single back turn. This frees the adjacent end of the bar 31 to move slightly upward, the bevelled under surface of the other end of said bar permitting the latter to move downward away from the nut 32. The clamping device is now in adjustment and ready to release or receive the base 5 of the instrument which is rigidly and accurately clamped in position by simply turning down the knurled thumb nut 34. The clamp once adjusted will remain so until considerably worn when it may be readjusted by following the above procedure.

When the instrument is not in use, the frame can readily be separated from the graduated base plate by simply loosening the nut 34, whereupon the two main parts thus separated can be packed in a compact storing and carrying case, as shown in Fig. 6. The case is preferably opened at the top. In setting up the instrument, the base plate 2 is removed from the carrying case by grasping the nuts 32 and 33, while the frame of the instrument is conveniently grasped by the transverse handle part 10.

It will be seen that by virtue of the quick acting clamping device which permits the frame of the instrument to be readily detached from the graduated base plate, it is possible to pack the instrument into a very much smaller carrying case than would otherwise be possible; in fact, by means of this improvement I have been able to reduce the size of the carrying case to one half or even one third the size that would otherwise be required.

The clamping device is obviously quick and positive in action and is very compact, extending only a little above the top of the base plate proper. Furthermore, the clamp is adapted to lock the frame of the instrument in position on the base plate so accurately that the line of sight is always brought so nearly parallel with the straight edge that errors on this account are negligible even though the scale employed for mapping should be much larger than any actually used in practice.

While the construction illustrated and described is of a preferred form, it is to be understood that the foregoing disclosure is presented for the purpose of explanation and that various changes can be made within the terms of the following claims, which indicate the scope of the invention.

What I claim as my invention is:

1. In a surveying instrument or the like, the combination of a base plate having a graduated straight edge for plotting points on a plane table, a frame, a sighting device pivotally mounted on said frame, and manually operable readily disengageable means adapted to detachably secure the frame rigidly to the base plate with the plane of rotation of the sighting device in a predetermined relation to the straight edge of the base plate.

2. In a surveying instrument or the like, the combination of a base plate having a graduated straight edge for plotting points on a plane table, a frame, a sighting device pivotally mounted on said frame, the base plate and frame structures having directly coacting surfaces formed thereon in predetermined relations to the straight edge of the base plate and the plane of rotation of the sighting device, respectively, and manually operable readily disengageable clamping means for holding said surfaces in contact.

3. In a surveying instrument or the like, the combination of a base plate having a graduated straight edge for plotting points on a plane table, a frame, a sighting device pivotally mounted on said frame, the base plate and frame structures having coacting surfaces formed thereon in predetermined relations to the straight edge of the base plate and the plane of rotation of the sighting device, respectively, and manually operable readily disengageable clamping means for holding said surfaces in contact, said clamping means comprising a section adapted to be adjusted to compensate for wear of the parts.

4. In a surveying instrument or the like, the combination of a base plate having a graduated straight edge for plotting points on a plane table, a frame, a sighting device pivotally mounted on said frame, an abutment rigid with the base plate and formed with a surface in predetermined relation to the straight edge of said plate, the said frame having a part formed with a surface in predetermined relation to the plane of rotation of the sighting device to coact with said abutment surface, and manually operable means movably mounted on the base plate and adapted to hold the said coacting surfaces in fixed engagement with each other.

5. In a surveying instrument or the like, the combination of a base plate having a graduated straight edge for plotting points on a plane table, a frame, a sighting device pivotally mounted on said frame, an abutment rigid with the base plate and formed on one side with an undercut bevel surface disposed in predetermined relation to the straight edge of said plate, a second abutment vertically movably mounted on the base plate parallel to the first abutment and spaced therefrom, the said frame having a base section with parallel bevel surfaces, one of said latter surfaces being disposed in predetermined relation to the plane of rotation of the sighting device and adapted to fit the undercut surface on the fixed abutment while the other is arranged to be engaged by the vertically movable abutment, and manually operable means for pressing the movable abutment against the last named bevel surface of the base section of the frame so as to hold the frame in firm engagement with said fixed abutment.

6. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second abutment movably mounted on the base plate parallel to the first abutment and spaced therefrom, the said frame having a base section formed on one side with a surface disposed in predetermined relation to the plane of rotation of the sighting device and adapted to fit the undercut surface on the fixed abutment and the said base section and movable abutment having coacting surfaces whereby movement of the abutment forces the base section into engagement with the fixed abutment, and manually operable means for actuating the movable abutment and holding it in engagement with the base section of the frame.

7. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second abutment movably mounted on the base plate in spaced parallel relation to the first abutment and comprising a section adjustable toward and from the first abutment, the said frame having a base section formed on one side with a surface disposed in predetermined relation to the plane of rotation of the sighting device and adapted to fit the undercut surface on the fixed abutment and the said base section and adjustable part of the movable abutment having coacting surfaces whereby movement of the abutment forces the base section of the frame into engagement with the fixed abutment, and manually operable means for actuating the movable abutment and holding it in engagement with the base section of the frame.

8. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second elongated abutment disposed on the base plate in spaced parallel relation to the first abutment, means at one end of the elongated abutment to hold said end against horizontal displacement relative to the first abutment but adapted to permit its other end to move vertically, means for holding its other end against horizontal displacement, the said frame having a base section formed on one side with a surface disposed in predetermined relation to the plane of rotation of the sighting device and adapted to fit the undercut surface on the fixed abutment and the base section and elongated abutment having coacting surfaces whereby vertical movement of said abutment forces the base section of the frame into engagement with the fixed abutment, and manually operable means for forcing the vertically movable end of the elongated abutment downward to press the base section of the frame against the fixed abutment.

9. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second elongated abutment disposed on the base plate in spaced parallel relation to the first abutment and comprising a section adjustable toward and from the first abutment, means at one end of the elongated abutment to hold said end against horizontal displacement relative to the first abutment but adapted to permit its other end to move vertically, means for holding its other end against horizontal displacement, said frame having a base section formed on one side with a surface disposed in predetermined relation to the plane of rotation of the sighting device and adapted to fit the undercut surface on the fixed abutment and the said base section and adjustable part of the second abutment having coacting surfaces whereby vertical movement of the abutment forces the base section of the frame into engagement with the fixed abutment, and manually operable means for forcing the vertically movable end of the elongated abutment downward to press the base section of the frame against the fixed abutment.

10. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second abutment movably mounted on the base plate in spaced parallel relation to the first abutment and comprising a main section and a section adjustable thereon toward and from the fixed abutment, adjusting screws for forcing the adjustable section toward the fixed abutment, and means for clamping the adjustable section rigidly to the movable section, the said frame having a base section formed on one side with a surface disposed in predetermined relation to the plane of rotation of the sighting device and adapted to fit the undercut surface on the fixed abutment and the said base section and adjustable part of the movable abutment having coacting surfaces whereby movement of the abutment forces the base section of the frame into engagement with the fixed abutment, and manually operable means for actuating the movable abutment and holding it in engagement with the base section of the frame.

11. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second elongated abutment disposed on the base plate in spaced parallel relation to the first abutment and comprising a bar apertured at its ends, screw studs on the base plate extending through the apertured ends of said bar, the base plate and bar being formed adjacent one end of the bar with a clearance between them, and nuts on the screw studs for forcing the abutment bar toward the base plate, the said frame having a base section formed on one side with a surface disposed in predetermined relation to the plane of rotation of the sighting device and adapted to fit the undercut surface on the fixed abutment and the base section and the second abutment having coacting surfaces whereby vertical movement of said abutment forces the base section of the frame into engagement with the fixed abutment.

12. In a surveying instrument or the like, the combination of a base plate having a graduated straight edge for plotting points on a plane table, a frame, a sighting device pivotally mounted on said frame, an abutment rigid with the base plate and formed on one side with an undercut surface disposed in predetermined relation to the straight edge of said plate, a second elongated abutment disposed on the base plate in spaced parallel relation to the first abutment and comprising a bar apertured at its ends, screw studs on the base plate extending through the apertured ends of said bar, the base plate and bar being formed adjacent one end of the bar with a clearance between them, a section movably mounted on said bar for adjustment toward and from the fixed abutment, and nuts on the screw studs for forcing the abutment bar toward the base plate, the said frame having a base section formed on one side with a surface disposed in predetermined relation to the plane of rotation of the sighting device and adapted to fit the undercut surface on the fixed abutment and the base section and the said adjustable part of the second abutment having coacting surfaces whereby vertical movement of said abutment forces the base section of the frame into engagement with the fixed abutment.

In testimony whereof, I hereunto affix my signature.

FRANCIS E. VAUGHAN.